(12) United States Patent
Grovit

(10) Patent No.: US 8,424,750 B2
(45) Date of Patent: Apr. 23, 2013

(54) AUTHORIZATION SYSTEM

(75) Inventor: Felix Fareed Grovit, London (GB)

(73) Assignee: Secoren Limited, Kowloon (HK)

( * ) Notice: Subject to any disclaimer, the term of this patent is extended or adjusted under 35 U.S.C. 154(b) by 502 days.

(21) Appl. No.: 12/583,063

(22) Filed: Aug. 13, 2009

(65) Prior Publication Data

US 2010/0001058 A1  Jan. 7, 2010

(51) Int. Cl.
| G06F 17/00 | (2006.01) |
| G07F 19/00 | (2006.01) |
| G06K 5/00 | (2006.01) |
| G06Q 20/00 | (2012.01) |
| G06Q 30/00 | (2012.01) |
| G06Q 40/00 | (2012.01) |

(52) U.S. Cl.
USPC ........... 235/375; 235/379; 235/380; 235/382; 705/16; 705/17; 705/39; 705/43; 705/44

(58) Field of Classification Search .................. 235/375, 235/379, 380, 382; 705/16–18, 26–28, 39–44
See application file for complete search history.

(56) References Cited

U.S. PATENT DOCUMENTS

| 6,105,008 A | 8/2000 | Davis et al. |
| 2004/0232220 A1* | 11/2004 | Beenau et al. ................ 235/380 |
| 2005/0242172 A1* | 11/2005 | Murata ......................... 235/380 |
| 2006/0102717 A1 | 5/2006 | Wood et al. |
| 2008/0283594 A1* | 11/2008 | Unbehagen .................. 235/380 |

FOREIGN PATENT DOCUMENTS

| GB | 2370475 A | 6/2002 |
| WO | WO 01/09851 A1 | 2/2001 |
| WO | WO 01/16900 A2 | 3/2001 |

* cited by examiner

*Primary Examiner* — Michael G Lee
*Assistant Examiner* — Laura Gudorf
(74) *Attorney, Agent, or Firm* — Flaster/Greenberg PC

(57) ABSTRACT

An authorization system including an authorization server, an account server for storing account data relating to a plurality of accounts and an access terminal for inputting data that identifies one of the plurality of accounts.

16 Claims, 8 Drawing Sheets

AUTHORIZATION SYSTEM

BACKGROUND OF THE INVENTION

1. Field of the Invention

The present invention relates to a transaction authorization system including an authorization server, an account server for storing account data relating to a plurality of accounts and an access terminal.

2. Description of the Prior Art

The authorization systems currently available have a number of problems associated therewith, including problems related to security and efficiency of data transmissions.

SUMMARY OF THE INVENTION

The present invention provides an authorization system comprising an authorization server; an account server for storing account data relating to a plurality of accounts; an access terminal, including a token reader for inputting token data from a selected one of a plurality of tokens, the token data identifying one of the plurality of accounts; input means for inputting transaction data; wherein the access terminal is operable to receive token data from the token reader and to receive transaction data from the input means; to transmit to the account server a first transaction request containing the token data and the transaction data; and to transmit to the authorization server a second transaction request including access terminal identification data identifying the access terminal; wherein the account server is operable to receive the transaction request; to process the token data to generate account identification data, the account identification data being associated with a portion of the account data; and to transmit a third transaction request to the authorization server, the third transaction request including the transaction data; wherein the authorization server is operable to receive the second transaction request and to receive the third transaction request; to process the transaction data and the access terminal identification data to determine whether the access terminal is authorized to enable the transaction; and, if applicable, to transmit to the account server an authorization request to indicate that the access terminal is authorized; and wherein, in response to receipt of the authorization request form the authorization server, the account server is operable to process the transaction data and to modify the account data associated with the account identification data in dependence on the processing.

The present invention can also separately provide access terminal, an account server (which may be in the form of an account management server and an account processing server, which may be provided independently) and an authorization server in accordance with the features defined in the claims and as described below. Corresponding methods may also be provided. Novel sub-components of the access terminal, account server and/or authorization server may also be provided as independent aspects of the present invention.

For example, in another aspect of the present invention there is provided an access terminal for use in an authorization system including an authorization server and an account server for storing account data relating to a plurality of accounts, the access terminal including: a token reader for inputting token data from a selected one of a plurality of tokens, the token data identifying one of the plurality of accounts; and input means for inputting transaction data; wherein the access terminal is operable to receive token data form the token reader and to receive transaction data from the input means; to transmit to the account server a first transaction request containing the token data and the transaction data; and to transmit to the authorization server a second transaction request including access terminal identification data identifying the access terminal.

In a further aspect of the invention there is provided an authorization server for use in an authorization system including an access terminal and an account server, the access terminal being operable to transmit to the account server a first transaction request containing token data received from a token reader and transaction data received from input means, and an account server for storing account data relating to a plurality of accounts and operable to receive the first transaction request; to process the token data to generate account identification data, the account identification data being associated with a portion of the account data, and the authorization server comprising: means for receiving from the access terminal a second transaction request including access terminal identification data identifying the access terminal; means for receiving from the account server a third transaction request including the transaction data; means for processing the transaction data and the access terminal identification data to determine whether the access terminal is authorized to enable the transaction; and means for transmitting to the account server an authorization request to indicate that the access terminal is authorized, whereby in response to receipt of the authorization request form the authorization server, the account server can process the transaction data and modify the account data associated with the account identification data in dependence on the processing.

It will be appreciated that the communications between elements of the authorization system may be carried out via intermediary devices. For example, the authorization server may communicate with the account processing server via a third party. Any references herein to communications between two parties should not be construed as excluding communications via an intermediary.

As is explained in more detail below, the present invention can be applied in fields such as physical security systems, process automation and transaction processing (but is not limited thereto).

The present invention can be implemented in any convenient form, for example using dedicated hardware, or a mixture of dedicated hardware and software. The present invention is suited to implementation as computer software implemented by a workstation or laptop computer. The invention may further comprise one or more networks, which can include any local area network or wide area, conventional terrestrial or wireless communications network. The system and system components may comprise any suitably programmable apparatuses such as a general purpose computer, personal digital assistant, mobile telephone (such as a WAP or 3G-compliant phone) and so on. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Although each aspect and various features of the present invention have been defined hereinabove independently, it will be appreciated that, where appropriate, each aspect can be used in any combination with any other aspect(s) or features of the invention. References to a plurality of items may generally be replaced by references to singular items and vice versa, where applicable (so that the invention may be implemented using only one account, for example).

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

It should be noted that in the following description like numerals denote like features in the figures.

Figure 1:
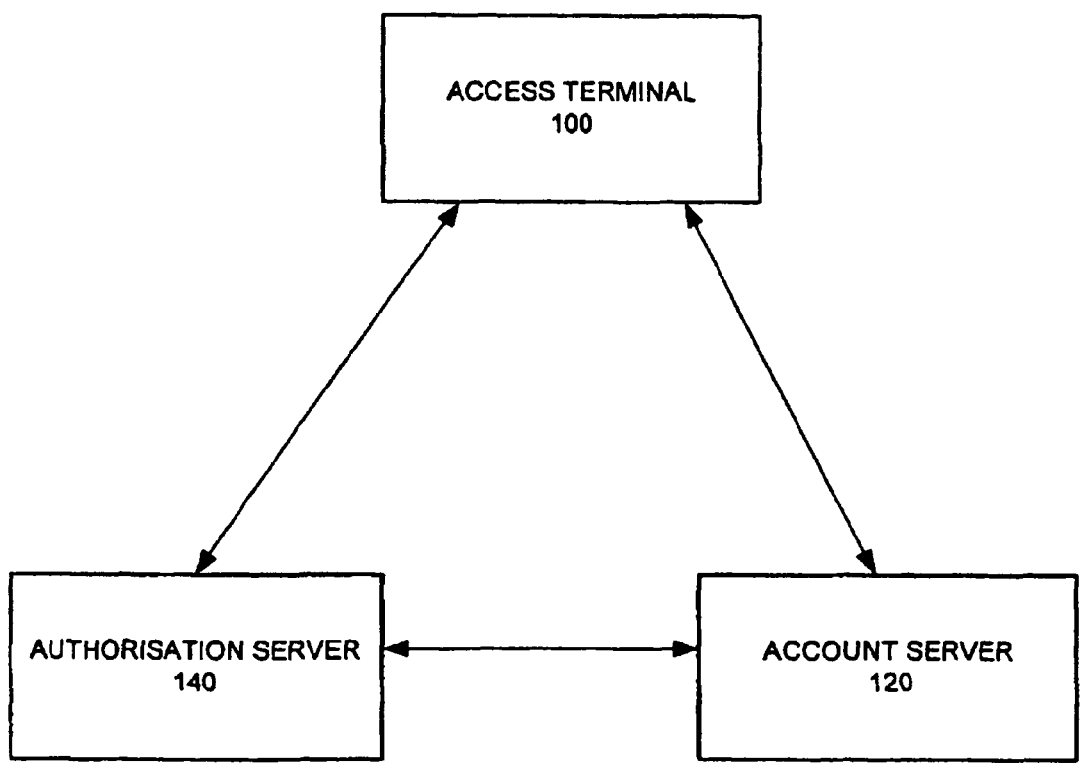
FIG. 1 is an overview of an authorization system.

FIG. 1 is an overview of the authorization system. An access terminal 100, account server 120 and authorization server 140 are provided. The terminal 100, server 120 and server 140 are interlinked to allow communications between the three elements.

Figure 2:
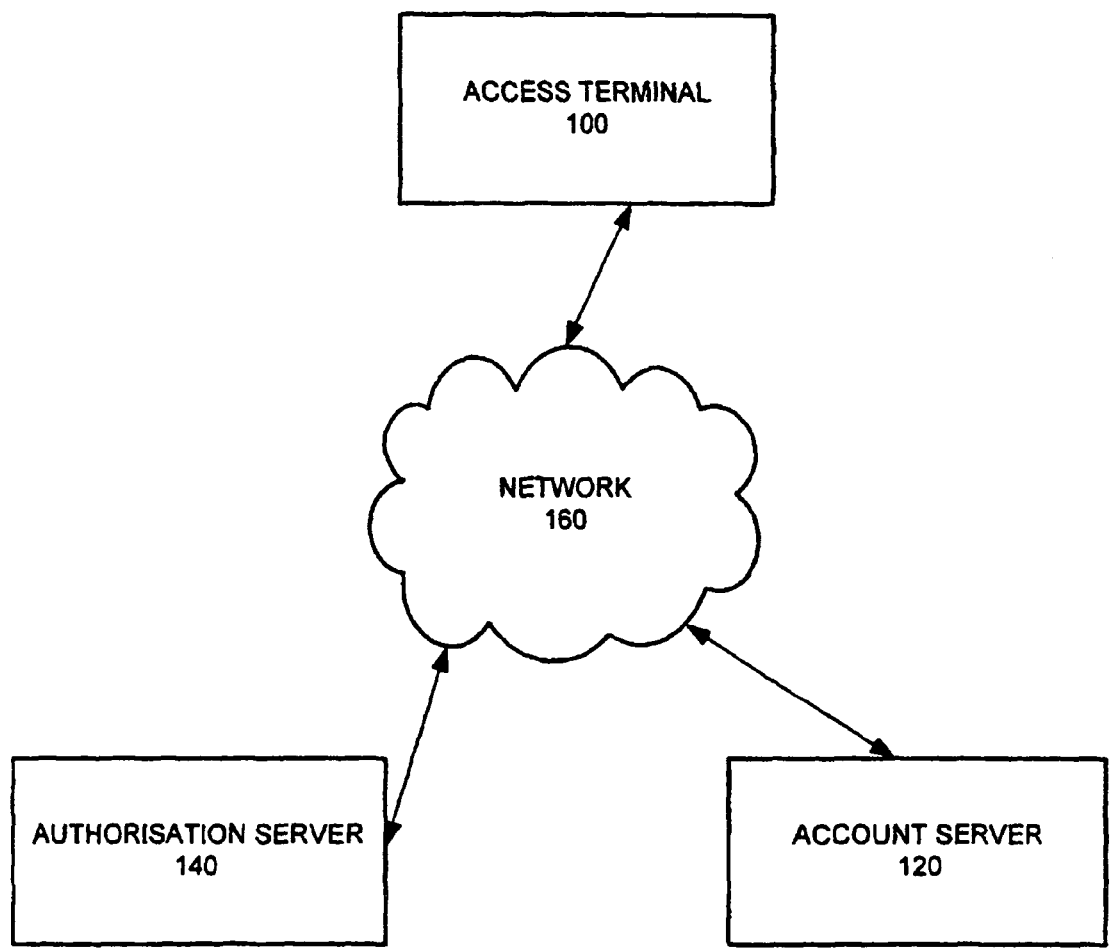
FIG. 2 is an overview of an embodiment of the authorization system of FIG. 1.

FIG. 2 is an overview of an embodiment of the authorization system of FIG. 1. In this embodiment, the access terminal 100, account server 120 and authorization server 140 are connected by a network 160, such as the Internet or another wide or local area network (or appropriate combination). Alternatively, any reference to a network may be considered also to cover dedicated or other point-to point links.

Figure 3:
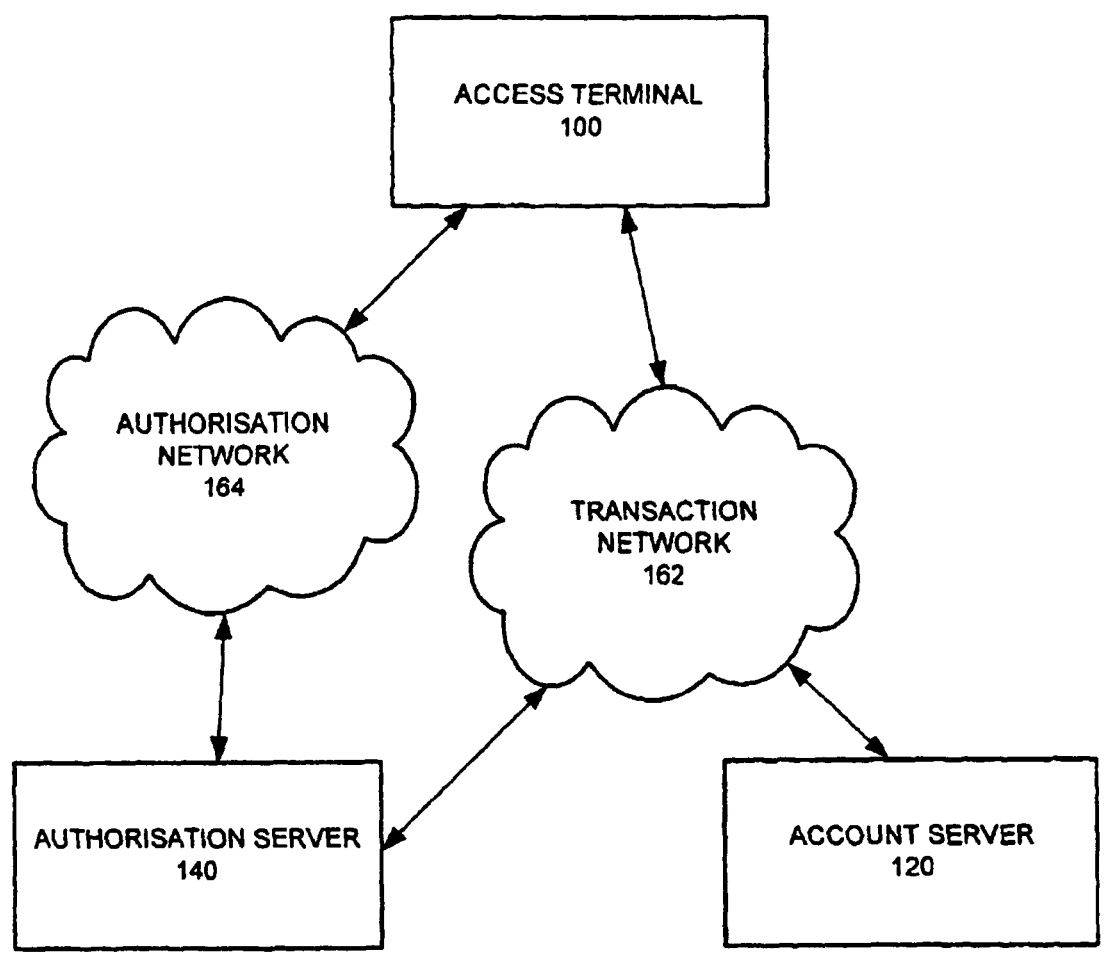
FIG. 3 is an overview of another embodiment of the authorization system of FIG. 1.

FIG. 3 is an overview of another embodiment of the authorization system of FIG. 1. In this embodiment, the access terminal 100, account server 120 and authorization server 140 are interconnected by a transaction network 162 and an authorization network 164. Each of the networks 162, 164 may have differing levels of security, different data capacity and different properties. For example, the transaction network 162 may be a high security network used for processing large numbers of transactions between multiple access terminals and even multiple account servers. The authorization network 164 may be, for example, a relatively low-bandwidth network through which the authorization server 140 and a number of approved (or otherwise) access terminals can communicate. The network 164 can even be a unidirectional link from the access terminal to the authorization server. Security can be increased not only be dividing the authorization features into different system components, but by the use of separate networks for the different aspects of the authorization process. Security may be maintained to some degree even if one of the two networks (or one of the account and authorization servers) was compromised.

Figure 4:
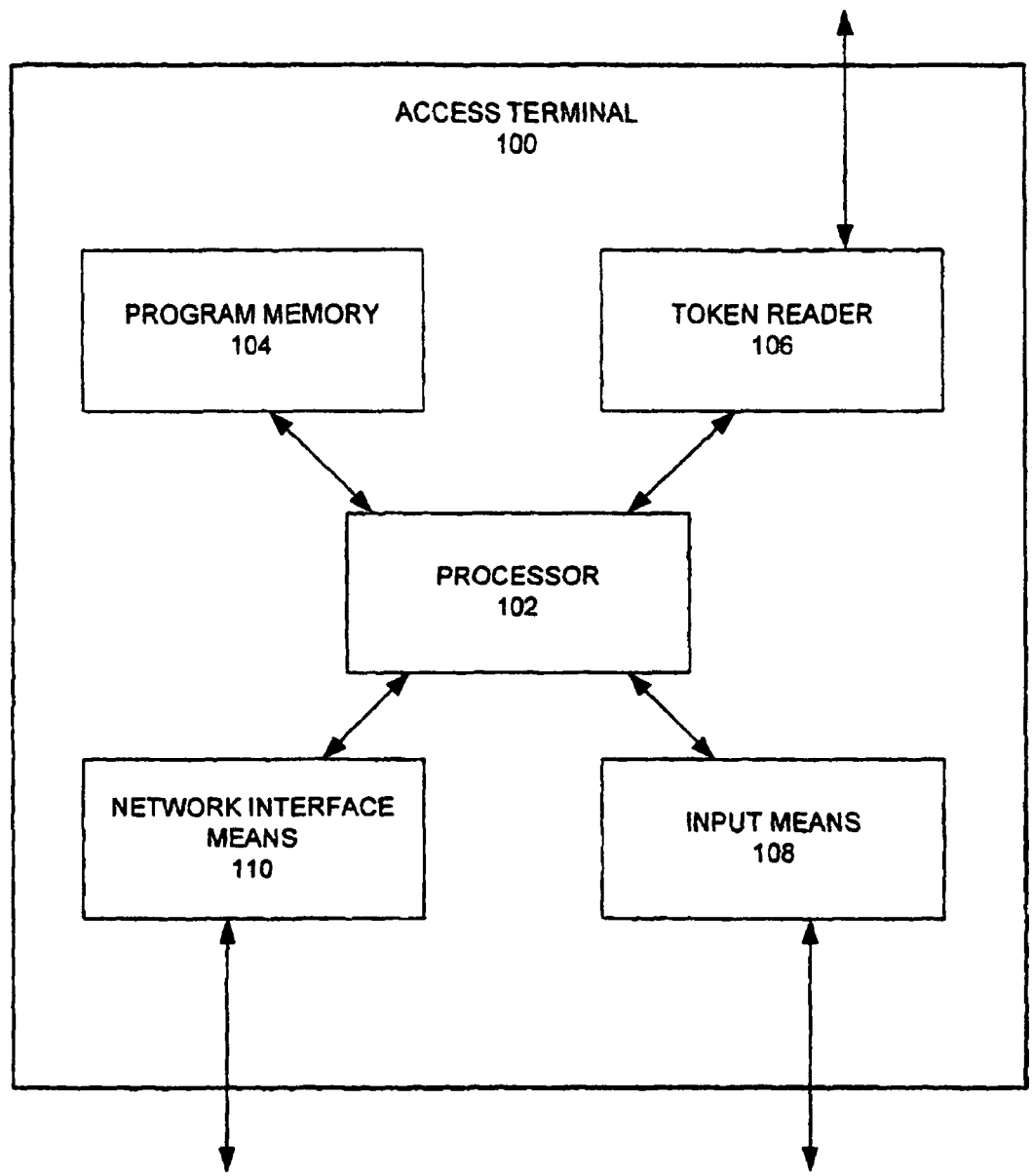
FIG. 4 is an overview of the access terminal of FIG. 1.

FIG. 4 is an overview of the access terminal of FIG. 1. The terminal 100 includes a processor 102, program memory 104 containing instructions to be executed by the processor, a token reader 106 (such as a smartcard, swipecard, bar code, infrared, RFID, or other reader), network interface means 110 (which may comprise interfaces with one or more networks, or any other input and/or output device suitable for communication with the other parts of the system and input means 108). The terminal may be a stand-alone computer system, dedicated computer hardware or a distributed collection of components suitably interconnected. Displays and other input/output devices may also be provided in connection with this and other devices as applicable.

Figure 5:
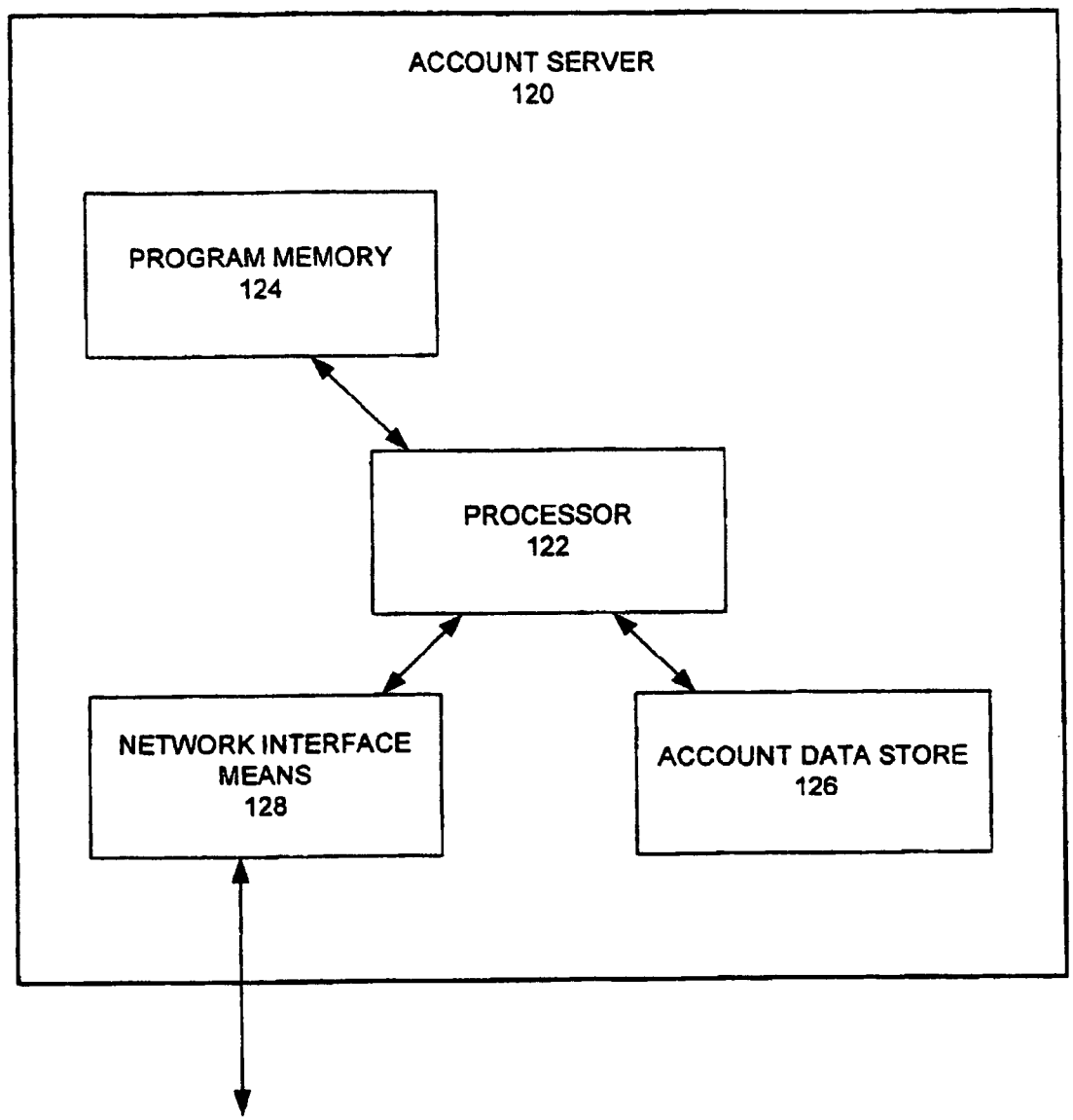
FIG. 5 is an overview of the account server of FIG. 1.

FIG. 5 is an overview of the account server of FIG. 1. The account server 120 includes one or more processors 122, one or more program memories 124, one or more account data stores 126 operable to store account data, and one or more network interface means 128 (which may comprise interfaces with one or more networks). The account server 120 may be provided in separate parts, such as a separate account management server and account processing server. This can improve the security of the system. The features of the account server 120 may be distributed across a number of systems for increased capacity and response times, for example.

Figure 6:
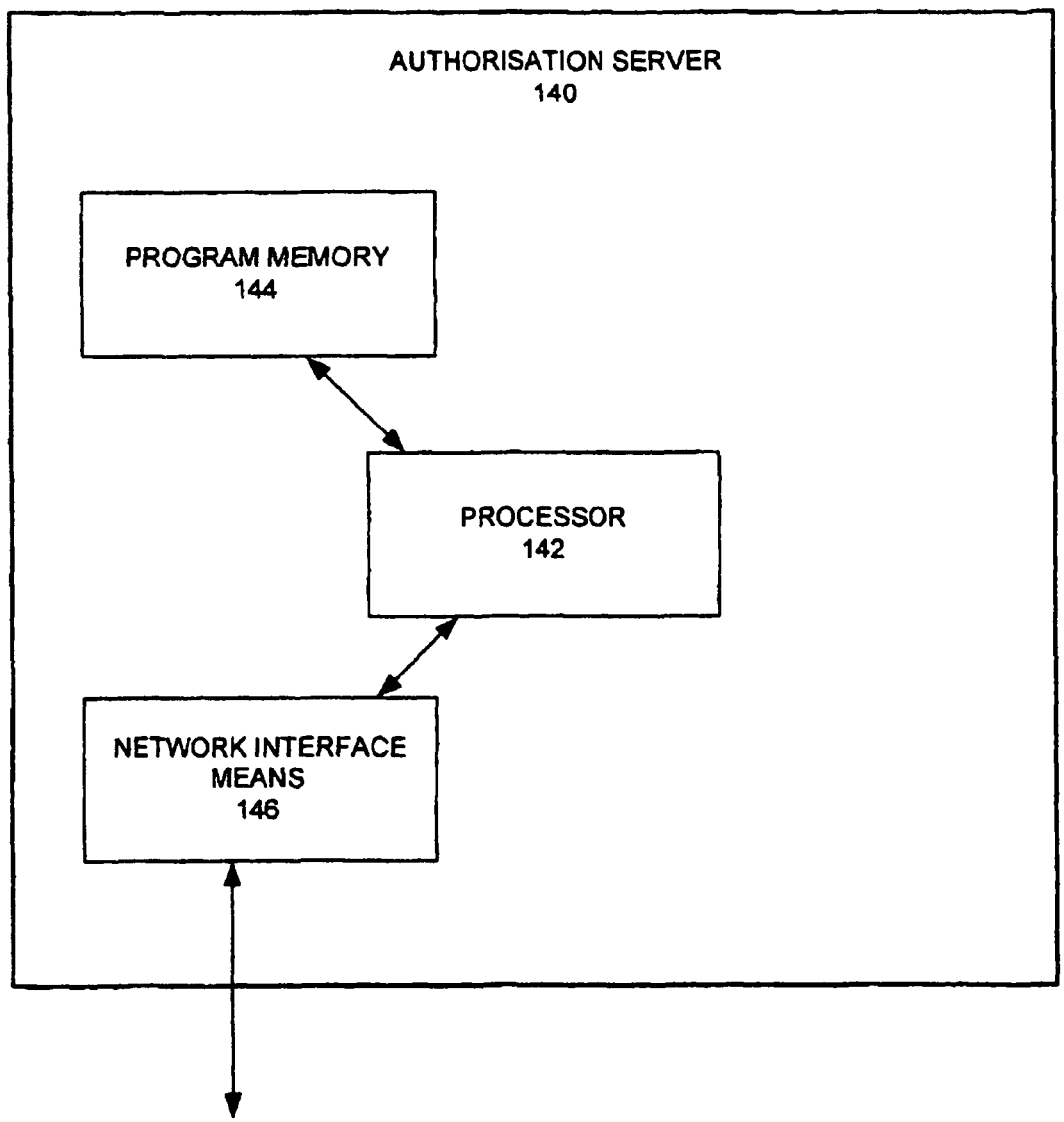
FIG. 6 is an overview of the authorization server of FIG. 1.

FIG. 6 is an overview of the authorization server of FIG. 1. The authorization server 140 includes one or more processors 142, one or more program memories 144 and one or more network interface means 146, all as described above.

Figure 7:
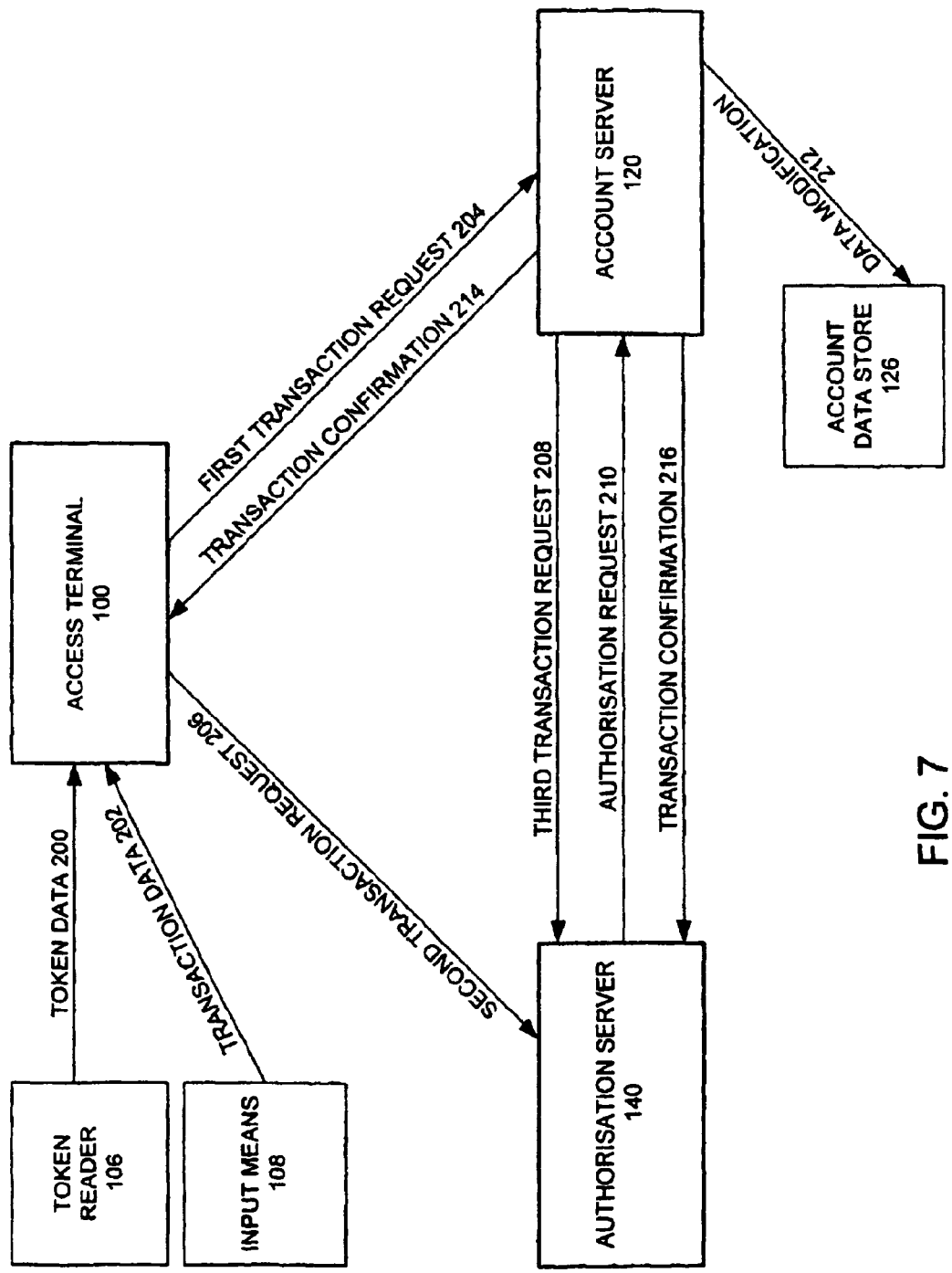
FIG. 7 is an overview of data transmissions within the system of FIG. 1.

FIG. 7 is an overview of data transmissions between the access terminal 100 (including token reader 106 and input means 108), account server 120 (including account data store 126) and authorization server 140.

During one example of the use of the system, a token (such as a flexible card with a magnetic stripe and/or smartcard, flash memory device, printed bar code, or the like) is read by the token reader 106, causing token data 200 (such as an identification number, authorization data, or the like) to be input at the access terminal. Transaction data 202 (such as an amount or quantity, a selection or type or particular instance of an object, a selection of a process to apply, or the like) is then input by the input means 108.

The access terminal 100 then formulates and transmits a first transaction request 204 to the account server 120. The first request 204 includes the token data 200 and the transaction data 202, and optionally further information (such as an identification of the access terminal, terminal operator and/or token holder). A further (second) transaction request 206 is then formulated and transmitted to the authorization server 140. The second request 206 includes access terminal identification data which identifies the access terminal (or, optionally, the operator of the terminal, and also optionally other data such as the token data).

The account server 120 then processes the request 204 and formulates a further (third) transaction request 208 (optionally the same as the original request 204) which it forwards to the authorization server 140. The third request 208 includes the transaction data but not the token data (although optionally this may be the case). In one particular embodiment, the token data contains originator data (encoded in a token identification number, for example) which identifies the authorization server out of a possible plurality of service provider servers, and causes the account server 120 to route communications accordingly.

It will be noted that the transaction data, the token data and the access terminal identification data are typically not transmitted via the same path, and neither the authorization server or the account server receives all three pieces of information. This improves security and privacy.

The authorization server evaluates the access terminal identification data and the transaction data to evaluate whether the transaction should be permitted. If so, an authorization request 210 (which may include a transaction or session identifier or similar) is transmitted to the account server 120. In response, the account server 120 makes a modification 212 to the data in the account data store 126 to effect the transaction (by making the appropriate modification to account data associated with the token). A confirmation 214 is then (optionally) transmitted to the access terminal 100 and a confirmation 216 is also (optionally) transmitted to the authorization server 140.

Figure 8:
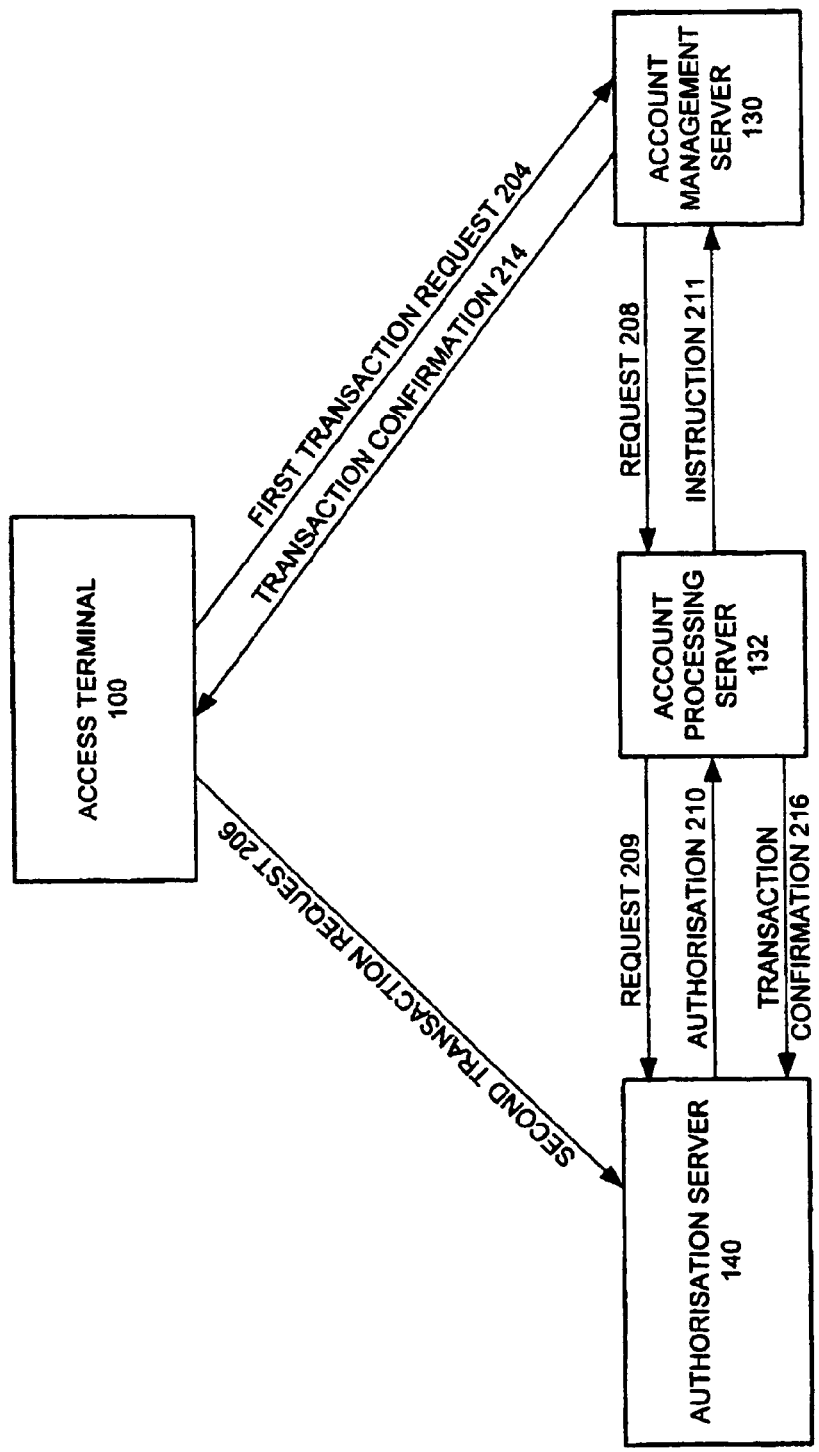
FIG. 8 is an overview of data transmissions within another embodiment of an authorization system.

FIG. 8 is an overview of data transmissions within another embodiment of the authorization system. For simplicity the token reader 106, input means 108 and account data store 126 are omitted. In this embodiment an access terminal 100, account management server 130, an account processing server 132 and an authorization server 140 are shown. The division of the account server 120 into servers 130 and 132 can further increase the security of the system.

In this embodiment, essentially the same processing steps are undertaken. A first transaction request 204, including the token data and transaction data, and a second transaction request 206, including the agent identification data, are transmitted as described hereinabove. The account management server 130 forwards a transaction request 208 to the account processing server 132, which in turn forwards a request 209 to the authorization server. The authorization request 210 is returned to the account processing server 132, which then forwards an instruction 211 to the account management server 130 to cause the server 130 to carry out the transaction. In this embodiment the account management server controls the account data store and carries out the required processing to determine where the transaction request should be routed. This can allow a plurality of account processing servers 132 to be provided, increasing the flexibility of the system. The account processing server 132 handles communications with the authorization server(s) 140, which can allow different authorization servers 140 to be provided without the need to reconfigure the account management server 130. Different distributions of functions between the servers 130, 132 and any other servers are possible.

Further steps of encryption/decryption and authorization may be carried out in one or more parts of the system.

The authorization system described above may be applied in any relevant context.

For example, in one embodiment the authorization system described above can be used to provide an access control system for a particular location. The tokens may correspond to security cards, and the access terminals may correspond to security access points, such as security card readers positioned at exits of a building, for example. The token reader may be a swipe card reader, and the input means may be a keypad reader, and the transaction data may comprise single use security codes. The account server may store access details for individual users and may store a list of codes which have been used (and which are therefore no longer valid). The single use codes can be provided by an electronic key chain or the like.

In this system, when a user swipes their card, their user details and the single use code are transmitted to the account server. The user details and an identification of the access point are transmitted to the authorization server. The account server can independently verify that the single use code is acceptable, by comparing it to the stored codes associated with the user. If the single use code is valid, the account server then asks the authorization server to verify that the identified user is entitled to have access to the relevant area (which it does by consideration of the user identification and the access point identification). If authorization is granted, the account server then carries out a transaction to update the user account to mark the code as expired. Confirmation of authorization is then transmitted to the access point to permit the user to pass the access point. Confirmation may also be provided to the authorization server, which may provide an independent log of entries, for example. Additional encryption and/or authorization can be provided.

This system can provide enhanced security by distributing different aspects of the authorization to different components of the system, whereby security could be maintained even if one of the authorization server and account sever were compromised. At the same time the complexity of the system has been kept to a relatively low level, permitting efficient and timely verification of users.

The account server may alternatively be provided as a separate account management server, responsible for logging and verifying the single use codes, and an account processing server, responsible for communications with the authorization server. The separation of functions can provide further security, because compromising the account processing server will not necessarily compromise the stored single use codes, for example.

A further, entirely independent embodiment concerns the use of the authorization system as described above in the context of a transaction system using cards that encode account data magnetically or otherwise. Such a card may include, for example, a printed 16-digit (or other) identification number and a magnetic stripe and/or secure smartcard. The token reader may comprise a swipe card reader or similar, which may be a conventional point-of-sale reader suitable for swiping credit or other similar cards (swiping may imply communicating with an embedded smartcard and the like, scanning a bar code, and so on, as well as physically swiping the card to read a magnetic stripe). Such a point-of-sale (POS) system may normally be used to carry out transactions involving a purchase of goods or services from the owner of the POS system, whereby a credit or other card is swiped and an amount of money is then credited to the account of the owner of the POS system. In this system, the computer systems of a credit card issuer may constitute the account management server, and the computer systems of a credit card processor may constitute the account processing server. Communications may be carried out via intermediaries, such as enabling the authorization server to communicate with the account processor server via a bank or similar institution (which may be advancing funds on behalf of the operator of the authorization server). Other arrangements are possible, analogous to the more general examples given above.

The authorization system described above could be used to provide a pre-paid credit card, for example by implementing the following features: (a) providing (or modifying) a third party computer system to act as the authorization server; (b) issuing a custom credit card (or similar) with a characteristic bin number (essentially an identification of the originator of the card [the third party], contained in various digits of the card); (c) adapting the account servers (credit card issuer and/or credit card processor) so that when a custom card is swiped at a point-of-sale system, the details of the swipe are redirected (on detection of the characteristic bin number) to the third party computer system for authorization and (d) further adapting the account servers so that, when authorization is received from the third party computer system, the account associated with the swiped card is credited with the amount of money corresponding to the number entered at the point-of-sale system. Here the account data includes an amount of credit associated with each card, for example. More or fewer modifications could of course be made. Thus a means for loading money onto a pre-paid card can be provided using existing point-of-sale equipment. In addition, the actions to load money on a pre-paid card can be the same as the actions used to process a sale (swipe a card, type in a sum of money). This can reduce the complexity of the system and reduce the amount of data transmissions in the system. Additionally, the point-of-sale system can be adapted, for example within the premises of agents of the third party, to transmit details of the requested transaction and identification of agent directly (or indirectly) to the third party computer systems, so that a decision to authorize the transaction can be made based on the identity of the agent (so the agent's credit rating can be evaluated, for example). In this embodiment, when a user presents funds to an agent, no transfer of funds occurs between the agent and the credit card issuer or processor, but funds are instead provided by the third party to the credit card issuer. The funds are then reimbursed by the agent to the third party in due course. The authorization process can be used to ensure that only transactions from trustworthy agents are processed. If the third party has a large liquidity and/or high trustworthiness, the credit card can be used with the reliability of a bank card, but without requiring a bank account. It should be noted that the present invention is not considered to be limited to this application.

Other embodiments are possible. For example, the system can be used to carry out processing of products in industry (particularly industries where many different custom products are manufactured). For example, a factory may be arranged so that certain operations are carried out on a range of products at a range of stations in the factory. Properties of the product are stored in an account server, with each account corresponding to a particular product and listing the operations that have been carried out on the product and, optionally, characteristics of the product. The token may be, for example, a bar code imprinted on each product at the start of the manufacture process. The token reader could therefore be a bar code reader.

At each station, a worker scans in the bar code of a product on which it is intended to carry out a process associated with the station. The worker then enters a code corresponding to a property of the process that is intended to be carried out, such as a process time, temperature, selection of material, pressure, or the like. The account server then verifies the records associated with the product, and passes on the request to the authorization server. The authorization server then verifies that the requested operation (transaction) is appropriate for the given product and station (information gathered from both the station computer [access terminal] and the account server). If so, the account server then authorizes the operation (for example by transmitting an enable signal to the relevant station or associated machinery) and records the requested operation.

Thus any dangerous or inappropriate processes can be prevented (by the authorization server), and it is possible to recall (from the account server) a history of processes carried out on a given product.

Yet further applications of the authorization system are of course possible. The term "token" may include any form of identification and/or data storage that it individually identifiable and that can be used to provide a data input (relating to the identification of stored data, for example). The term "transaction" (which may be interchangeable with "operation", for example) may include, for example, events, processes, financial transactions, industrial operations, and the like, and should not be construed narrowly.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An authorization system comprising:
an authorization server;
an account server for storing account data relating to a plurality of accounts;
an access terminal, including:
a token reader for inputting token data from a selected one of a plurality of tokens, the token data identifying one of the plurality of accounts; and
input means for inputting transaction data;
wherein the access terminal is operable to receive token data from the token reader and to receive transaction data from the input means; and transmit to the account server a first transaction request containing the token data and the transaction data; and to transmit to the authorization server a second transaction request including access terminal identification data identifying the access terminal; the account server being operable to receive the first transaction request; to process the token data to generate account identification data, the account identification data being associated with a portion of the account data; and to transmit a third transaction request to the authorization server, the third transaction request including the transaction data; the authorization server being operable to receive the second transaction request and to receive the third transaction request; to process the transaction data and the access terminal identification data to determine whether the access terminal is authorized to enable the transaction; if the terminal is authorized, to transmit to the account server an authorization request to indicate that the access terminal is authorized; and in response to receipt of the authorization request form the authorization server, the account server is operable to process the transaction data and to modify the account data associated with the account identification data in dependence on the processing.

2. An authorization system according to claim 1, in which the authorization server is one of a plurality of service provider servers, and the token data includes originator data identifying one of said service provider servers with which the token is associated, and wherein the account server is operable to process the originator data to identify the service provider server associated with the selected token, and to communicate with the identified service provider server in relation to the selected token.

3. An authorization system according to claim 2, wherein the account sever comprises: an account management server, including storage means for storing the account data; and an account processing server, including communication means for communicating with the authorization server.

4. An authorization system according to claim 3, wherein the access terminal is operable to transmit the first transaction request to the account server via a first network and to transmit the second transaction request to the authorization server via a second network.

5. An authorization system according to claim 4, wherein the account server is operable to transmit to at least one of the access terminal and authorization server confirmation data confirming that the transaction has been processed.

6. An authorization system according to claim 5, wherein the access terminal is operable to include the transaction data in the second transaction request.

7. An authorization server for use in an authorization system including an account sever for storing account data relating to a plurality of accounts and for processing token data to generate account identification data associated with a portion of the account data, and an access terminal operable to transmit to the account server a first transaction request containing token data received from a token reader and transaction data received from input means, and the authorization server comprising:
- means for receiving from the access terminal a second transaction request including access terminal identification data identifying the access terminal;
- means for receiving from the account server a third transaction request including the transaction data;
- means for processing the transaction data and the access terminal identification data to determine whether the access terminal is authorized to enable the transaction; and
- means for transmitting to the account server an authorization request to indicate that the access terminal is authorized, whereby in response to receipt of the authorization request from the authorization server, the account server can process the transaction data and modify the account data associated with the account identification data in dependence on the processing.

8. An authorization server according to claim 7, operable to receive the second transaction request from the access terminal via a first network and to receive the third transaction request from the account server via a second network.

9. An authorization server according to claim 8, operable to receive confirmation data from the account server confirming that the transaction has been processed.

10. An authorization server according to claim 9, operable to extract transaction data from the second transaction request and to process the transaction data.

11. A method of authorizing a transaction in a system including an authorization server, an account server for storing account data relating to a plurality of accounts and an access terminal, the method comprising:
- inputting token data from a selected one of a plurality of tokens at the access terminal, said token data identifying one of the plurality of accounts;
- inputting transaction data at the access terminal;
- transmitting from the access terminal to the account server a first transaction request containing token data and the transaction data;
- transmitting from the account server to the authorization server a second transaction request including access terminal identification data identifying the access terminal;
- processing token data at the account server to generate account identification data, the account identification data being associated with a portion of the account data;
- transmitting a third transaction request from the account server to the authorization server, the third transaction request including the transaction data;
- processing the transaction data and the access terminal identification data at the authorization server to determine whether the access terminal is authorized to enable the transaction;
- if the terminal is authorized, transmitting from the authorization server to the account server an authorization request to indicate that the access terminal is authorized; and
- in response to receipt of the authorization request from the authorization server, processing the transaction data at the account server and modifying the account data associated with the account identification data in dependence on the processing.

12. A method according to claim 11, in which the authorization server is one of a plurality of service provider servers, and the token data includes originator data identifying a one of said service provider servers with which the token is associated, and further comprising processing the originator data to identify the service provider server associated with the selected token, and communicating with the identified service provider server in relation to the selected token.

13. A method according to claim 12, further comprising storing the account data and communicating with the authorization server.

14. A method according to claim 13, further comprising transmitting the first transaction request form the access terminal to the account server via a first network and transmitting the second transaction request from the access terminal to the authorization server via a second network.

15. A method according to claim 14, further comprising transmitting from the account server to at least one of the access terminal and authorization server confirmation data confirming that the transaction has been processed.

16. A method according to claim 15, further comprising including the transaction data in the second transaction request.

* * * * *

UNITED STATES PATENT AND TRADEMARK OFFICE
CERTIFICATE OF CORRECTION

| | |
|---|---|
| PATENT NO. | : 8,424,750 B2 |
| APPLICATION NO. | : 12/583063 |
| DATED | : April 23, 2013 |
| INVENTOR(S) | : Felix Fahreed Grovit |

Page 1 of 1

It is certified that error appears in the above-identified patent and that said Letters Patent is hereby corrected as shown below:

ON THE TITLE PAGE

On the Title Page, left column, below Item (65) and the Publication number, insert new item and paragraph:

-- (30) Foreign Application Priority Data

February 28, 2007   GB   0703882.1 --.

Signed and Sealed this
Eighteenth Day of June, 2013

Teresa Stanek Rea
*Acting Director of the United States Patent and Trademark Office*